United States Patent
Yu

(10) Patent No.: US 9,991,700 B2
(45) Date of Patent: Jun. 5, 2018

(54) POWER BANK, POWER BANK SYSTEM AND METHOD THEREOF

(71) Applicant: CANYON SEMICONDUCTOR INC., Hsinchu (TW)

(72) Inventor: Po-Yuan Yu, Taoyuan (TW)

(73) Assignee: CANYON SEMICONDUCTOR INC., Hsinchu (TW)

( * ) Notice: Subject to any disclaimer, the term of this patent is extended or adjusted under 35 U.S.C. 154(b) by 356 days.

(21) Appl. No.: 14/809,682

(22) Filed: Jul. 27, 2015

(65) Prior Publication Data

US 2016/0261111 A1 Sep. 8, 2016

(30) Foreign Application Priority Data

Mar. 2, 2015 (TW) .............................. 104106465 A

(51) Int. Cl.
- *H02J 1/00* (2006.01)
- *H04L 29/06* (2006.01)
- *H04L 12/40* (2006.01)
- *H02J 7/00* (2006.01)

(52) U.S. Cl.
CPC .............. *H02J 1/00* (2013.01); *H02J 7/0068* (2013.01); *H04L 12/40045* (2013.01); *H04L 69/18* (2013.01)

(58) Field of Classification Search
CPC ......................................................... H02J 1/00
USPC .......................................................... 307/31
See application file for complete search history.

(56) References Cited

U.S. PATENT DOCUMENTS

| | | | |
|---|---|---|---|
| 2010/0060078 A1* | 3/2010 | Shaw | G05F 1/56 307/31 |
| 2011/0258464 A1* | 10/2011 | Gammel | G06F 1/266 713/300 |
| 2014/0300311 A1* | 10/2014 | Caren | H02J 7/0054 320/103 |

* cited by examiner

*Primary Examiner* — Joseph Chang
(74) *Attorney, Agent, or Firm* — WPAT, PC

(57) ABSTRACT

A power bank is disclosed. The power bank includes a voltage output port arranged to provide a first voltage level, and a voltage-controllable and current-bidirectional port arranged to selectively transit a first communication protocol. When the voltage-controllable and current-bidirectional port is arranged to transit the first communication protocol, the voltage-controllable and current-bidirectional port is arranged to output a second voltage level according to the first communication protocol.

21 Claims, 3 Drawing Sheets

POWER BANK, POWER BANK SYSTEM AND METHOD THEREOF

TECHNICAL FIELD

The present disclosure relates to a power bank, a power bank controlling system and a method thereof.

DISCUSSION OF THE BACKGROUND

With the evolution of technology, electronic devices having different kinds of functions are developed. Those electronic devices may be configured to have their own power supply standards. A power bank is a portable device designed for charging an electronic device. However, when all electronic devices have their own power banks, it may cause inconvenience for their users. To solve this problem, a conventional power bank capable of outputting a plurality of predetermined output powers is developed for the electronic devices. These predetermined output powers, however, are not adjustable. If an electronic device with a required power not covered by the predetermined output powers is plugged into the conventional power bank, the electronic device would not be powered up by the output power, and the output power may even destroy the electronic device.

SUMMARY

A novel power bank is provided to solve the above problem.

According to a first embodiment, a power bank is disclosed. The power bank comprises a voltage output port and a voltage-controllable and current-bidirectional port. The voltage output port is arranged to provide a first voltage level. The voltage-controllable and current-bidirectional port is arranged to selectively transit a first communication protocol, wherein when the voltage-controllable and current-bidirectional port is arranged to transit the first communication protocol, the voltage-controllable and current-bidirectional port is arranged to output a second voltage level according to the first communication protocol.

According to a second embodiment, a power bank system is disclosed. The power bank system comprises an external device and a power bank. The power bank comprises a voltage output port and a voltage-controllable and current-bidirectional port. The voltage output port is arranged to provide a first voltage level. The voltage-controllable and current-bidirectional port is arranged to selectively couple to the external device, wherein when the voltage-controllable and current-bidirectional port is coupled to the external device, the voltage-controllable and current-bidirectional port is arranged to transit a first communication protocol and to output a second voltage level to the external device according to the first communication protocol.

According to a third embodiment, a power bank controlling method is provided. The power bank controlling method comprises: providing a first voltage level on a voltage output port; selectively using a voltage-controllable and current-bidirectional port to transit a first communication protocol; and when the voltage-controllable and current-bidirectional port is arranged to transit the first communication protocol, outputting a second voltage level on the voltage-controllable and current-bidirectional port according to the first communication protocol.

The foregoing outlines features of several embodiments so that those skilled in the art may better understand the aspects of the present disclosure. Other technical features and advantages constituting claims of the present disclosure are described in the following descriptions. Those skilled in the art should appreciate that they may readily use the present disclosure as a basis for designing or modifying other processes and structures for carrying out the same purposes of the embodiments introduced herein. Those skilled in the art should also realize that such equivalent constructions do not depart from the spirit and scope of the present disclosure, and that they may make various changes or substitutions.

BRIEF DESCRIPTION OF THE DRAWINGS

Aspects of the present disclosure are best understood from the following detailed description when read with the accompanying figures. Please note that in accordance with the standard practice in the industry, various features are not drawn to scale. In fact, the dimensions of the various features may be arbitrarily increased or reduced for clarity of discussion.

DETAILED DESCRIPTION

In order for one with ordinary skill in the art to thoroughly understand the present disclosure, the following descriptions provide detailed steps and structures. Obviously, the implementation of the present disclosure is not limited to the specific details known by one with common knowledge in the art. On the other hand, well-known structures or steps are not described in the details of the description, so as to avoid unnecessary limitations to the present disclosure. Preferred embodiments of the present disclosure are described in detail as follows; however, in addition to these detailed descriptions, the present disclosure can also be widely applied in other embodiments. The scope of the present disclosure is not limited to the descriptions of embodiments, but is defined in the claims.

Figure 1:
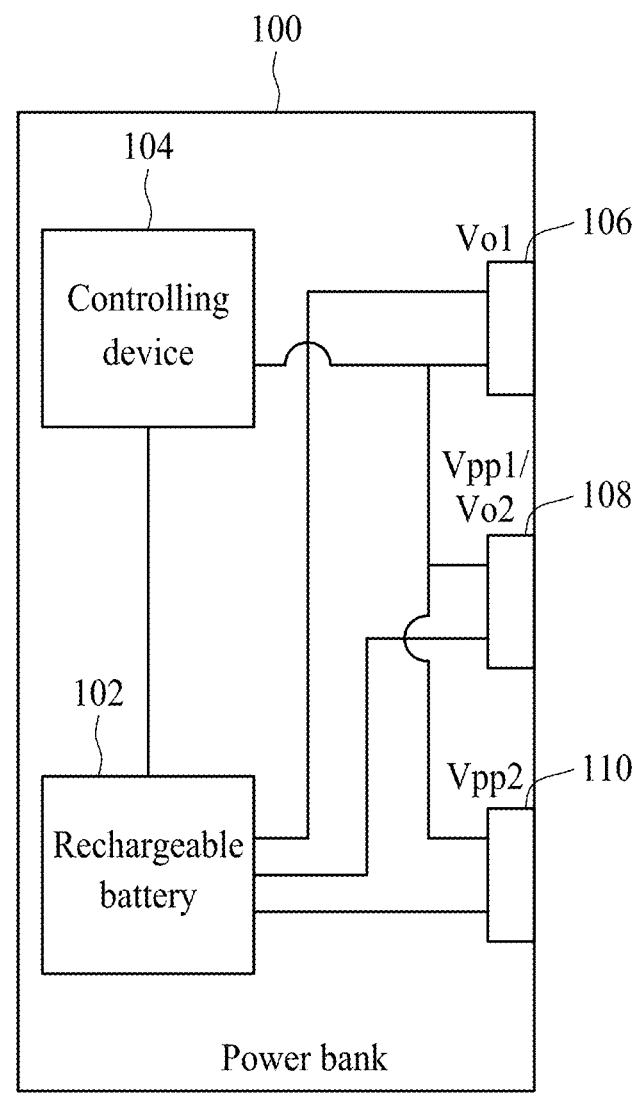
FIG. 1 is a diagram illustrating a power bank according to an embodiment of the present invention.

FIG. 1 is a diagram illustrating a power bank 100 according to an embodiment of the present invention. In this embodiment, the power bank 100 comprises a rechargeable battery 102, a controlling device 104, a voltage output port 106, a voltage-controllable and current-bidirectional port 108, and a fixed voltage charging port 110. The rechargeable battery 102 may have an electrical charge Q. The rechargeable battery 102 is coupled to the voltage output port 106, the voltage-controllable and current-bidirectional port 108, and the fixed voltage charging port 110. The controlling device 104 is coupled to the rechargeable battery 102, the voltage output port 106, the voltage-controllable and current-bidirectional port 108, and the fixed voltage charging port 110. It is noted that the controlling device 104 is installed external to the rechargeable battery 102. However, this is not a limitation of the present invention. In another embodiment, the rechargeable battery 102 may be integrated into the controlling device 104.

In this embodiment, the controlling device 104 is arranged to control the rechargeable battery 102 for outputting a first voltage level Vo1 on the voltage output port 106. The voltage-controllable and current-bidirectional port 108 is arranged to selectively couple to an external device (not shown in FIG. 1) or couple to a first power supply voltage Vpp1. When the voltage-controllable and current-bidirectional port 108 is arranged to couple to an external device, the controlling device 104 further receives a first communication protocol Shs1 via the voltage-controllable and current-bidirectional port 108, and outputs a second voltage level Vo2 on the voltage-controllable and current-bidirectional port 108 according to the first communication protocol Shs1 and the electrical charge Q of the rechargeable battery 102. Accordingly, the first voltage level Vo1 on the voltage output port 106 is a predetermined/fixed voltage level, and the second voltage level Vo2 on the voltage-controllable and current-bidirectional port 108 is any voltages within a voltage level range Vr. The controlling device 104 performs a handshaking operation with an external device to determine the second voltage level Vo2. Specifically, the controlling device 104 receives the first communication protocol Shs1 via the voltage-controllable and current-bidirectional port 108 to perform the handshaking operation with the external device. In other words, the voltage output port 106 of the power bank 100 is configured to provide a fixed voltage level to an external device coupled to the voltage output port 106, and the voltage-controllable and current-bidirectional port 108 is configured to provide an adaptive voltage level to another external device coupled to the voltage-controllable and current-bidirectional port. Therefore, the voltage output port 106 and the voltage-controllable and current-bidirectional port 108 are capable of outputting the first voltage level Vo1 and the second voltage level Vo2 substantially at the same time or at different times, respectively.

Please note that the term "communication protocol" in this embodiment may be regarded as the communication protocol signal.

In addition, when the voltage-controllable and current-bidirectional port 108 is not coupled to an external device, and the voltage-controllable and current-bidirectional port 108 is coupled to the first power supply voltage Vpp1, the controlling device 104 is arranged to charge the rechargeable battery 102 by using the first power supply voltage Vpp1.

Accordingly, this embodiment is capable of selectively providing a required supply voltage to an external device coupled to the voltage-controllable and current-bidirectional port 108, or charging the rechargeable battery 102 by using the first power supply voltage Vpp1 on the voltage-controllable and current-bidirectional port 108. Therefore, the voltage-controllable and current-bidirectional port 108 is a bidirectional port capable of receiving or transmitting signals.

Furthermore, the fixed voltage charging port 110 of the power bank 100 is arranged to receive a second power supply voltage Vpp2. When the second power supply voltage Vpp2 is coupled to the fixed voltage charging port 110, the controlling device 104 is further arranged to charge the rechargeable battery 102 by using the second power supply voltage Vpp2.

According to the operation of the power bank 100 as mentioned above, the rechargeable battery 102 can be charged by the first power supply voltage Vpp1 on the voltage-controllable and current-bidirectional port 108 and the second power supply voltage Vpp2 on the fixed voltage charging port 110. In the practical operation of the device, when the voltage-controllable and current-bidirectional port 108 and the fixed voltage charging port 110 receive the first power supply voltage Vpp1 and the second power supply voltage Vpp2, respectively, at the same time, the controlling device 104 may charge the rechargeable battery 102 by using the first power supply voltage Vpp1 and the second power supply voltage Vpp2 at the same time; or charge the rechargeable battery 102 by using the first power supply voltage Vpp1 and not using the second power supply voltage Vpp2; or charge the rechargeable battery 102 by using the second power supply voltage Vpp2 and not using the first power supply voltage Vpp1; or charge the rechargeable battery 102 by using the second power supply voltage Vpp2 first and using the first power supply voltage Vpp1 second; or charge the rechargeable battery 102 by using the first power supply voltage Vpp1 first and using the second power supply voltage Vpp2 second. Accordingly, charging the rechargeable battery 102 by the first power supply voltage Vpp1 and the second power supply voltage Vpp2 in different order also belongs to the scope of the present invention. It is noted that the second power supply voltage Vpp2 may be the same as or different from the first power supply voltage Vpp1.

In the embodiment, the voltage output port 106, the voltage-controllable and current-bidirectional port 108, and the fixed voltage charging port 110 can be any kind of connection ports, such as signal or power ports and/or output/input ports. In addition, the voltage output port 106, the voltage-controllable and current-bidirectional port 108, and the fixed voltage charging port 110 may each comprise more than one different or same ports.

Figure 2:
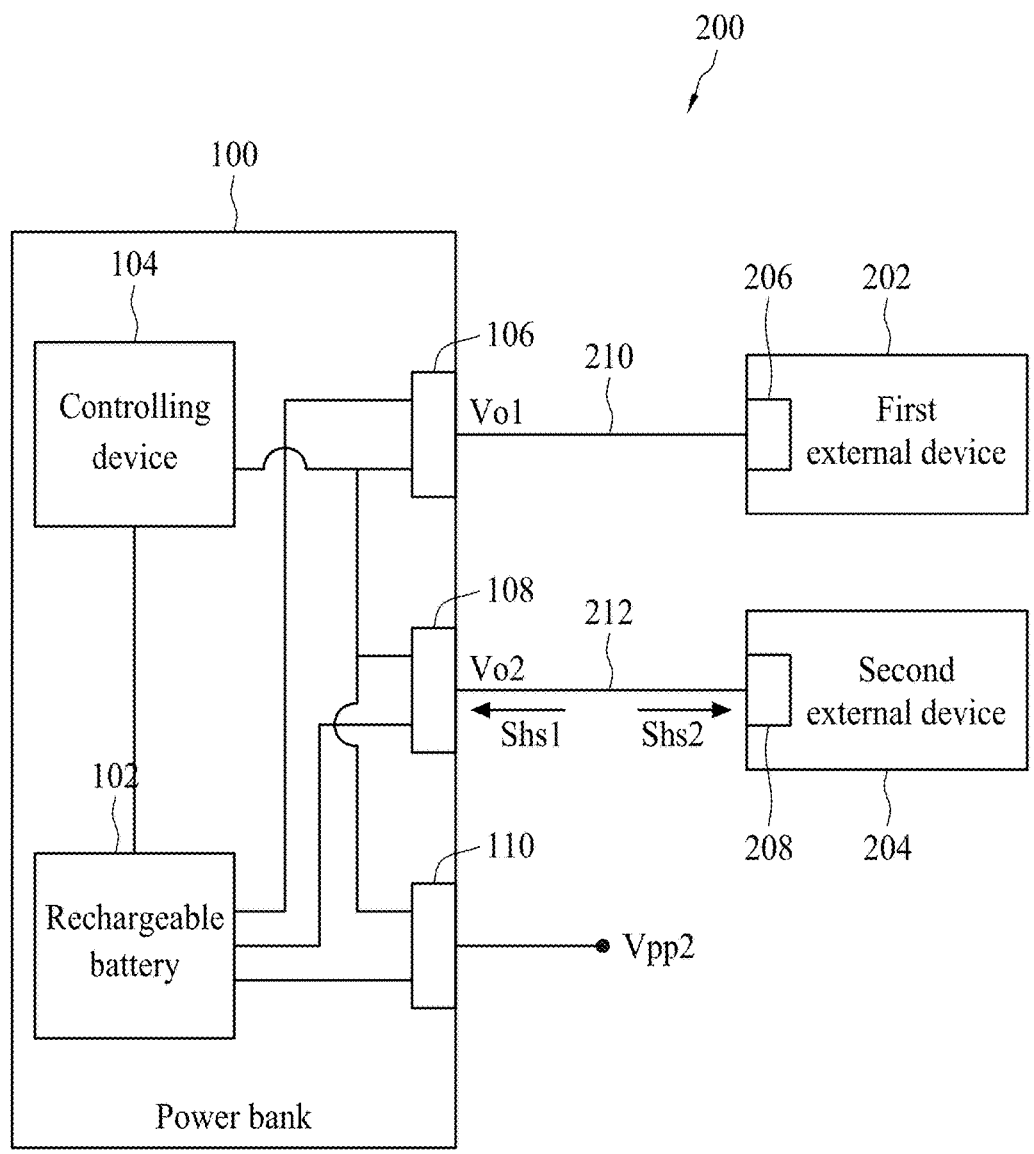
FIG. 2 is a diagram illustrating a power bank system according to an embodiment of the present invention.

FIG. 2 illustrates the operation of the power bank 100. FIG. 2 is a diagram illustrating a power bank system 200 according to an embodiment of the present invention. The power bank system 200 comprises the power bank 100, a first external device 202, and a second external device 204. A power input port 206 of the first external device 202 is coupled to the voltage output port 106 of the power bank 100 via a transmission line 210, and a power input port 208 of the second external device 204 is coupled to the voltage-controllable and current-bidirectional port 108 of the power bank 100 via a transmission line 212. The fixed voltage charging port 110 of the power bank 100 is coupled to the second power supply voltage Vpp2. Please note that the transmission lines 210, 212 can be any kind of transmission lines or connection lines as long as the transmission lines or connection lines can transmit power.

In the embodiment, the acceptable power supply voltage of the first external device 202 is substantially the first voltage level Vo1, and the acceptable power supply voltage of the second external device 204 is substantially the second voltage level Vo2, wherein the second voltage level Vo2 is different from the first voltage level Vo1, and the second voltage level Vo2 falls within the voltage level range Vr. As the controlling device 104 of the power bank 100 directly outputs the first voltage level Vo1 on the voltage output port 106 according to the electrical charge Q of the rechargeable battery 102, the first external device 202 can directly receive the first voltage level Vo1 via the transmission line 210. However, regarding the second external device 204, the second voltage level Vo2 of the second external device 204 is different from the first voltage level Vo1. Thus, the second external device 204 cannot directly couple to the voltage output port 106. As the second voltage level Vo2 falls within the voltage level range Vr, the second external device 204 can be coupled to the voltage-controllable and current-bidirectional port 108. Then, the controlling device 104 performs a handshaking operation to output the second voltage level Vo2 for the second external device 204.

In one embodiment, when the second external device 204 performs the handshaking operation with the controlling device 104, the second external device 204 transmits the first communication protocol Shs1 to the controlling device 104 via the transmission line 212 and the voltage-controllable and current-bidirectional port 108. The first communication protocol Shs1 may comprise the information of the second voltage level Vo2 required by the second external device 204. When the controlling device 104 receives the first communication protocol Shs1, the controlling device 104 may transmit a second communication protocol Shs2 to the second external device 204 to inform the second external device 204 if the controlling device 104 has the capability to generate the second voltage level Vo2. Similarly, the second communication protocol Shs2 is transmitted to the second external device 204 via the transmission line 212 and the voltage-controllable and current-bidirectional port 108. If the second voltage level Vo2 falls within the voltage level range Vr, meaning that the controlling device 104 can generate the second voltage level Vo2, then the controlling device 104 generates the second voltage level Vo2 on the voltage-controllable and current-bidirectional port 108 according to the electrical charge Q of the rechargeable battery 102. Accordingly, when the handshaking operation is finished, the second external device 204 can receive the required second voltage level Vo2 from the voltage-controllable and current-bidirectional port 108. In addition, if the second voltage level Vo2 does not fall within the voltage level range Vr, the controlling device 104 cannot output the required voltage or power on the voltage-controllable and current-bidirectional port 108. It is noted that the above mentioned handshaking operation is a simplified handshaking operation. The embodiment is not limited to the simplified handshaking operation. In other words, the above mentioned first communication protocol Shs1 may further comprise a plurality of signals generated by the second external device 204, and the second communication protocol Shs2 may also comprise a plurality of signals generated by the controlling device 104. The plurality of signals may be transmitted or have a handshake performed between the controlling device 104 and the second external device 204 via the voltage-controllable and current-bidirectional port 108. Those operations also fall within the scope of the present invention. For example, the handshaking operation can be the handshaking of a USB Power Delivery (PD).

In addition, this embodiment is configured to use one controlling device 104 to control the rechargeable battery 102 for generating the first voltage level Vo1 and the second voltage level Vo2. However, this is not a limitation of the present invention. In another embodiment, the power bank 100 may comprise two controlling devices for generating the first voltage level Vo1 and the second voltage level Vo2, respectively, according to the electrical charge Q of the rechargeable battery 102.

In addition, in the practical operation of the device, when the controlling device 104 outputs the first voltage level Vo1 and the second voltage level Vo2 to the first external device 202 and the second external device 204 via the voltage output port 106 and the voltage-controllable and current-bidirectional port 108 respectively, the controlling device 104 may also output the required currents to the first external device 202 and the second external device 204 via the first voltage output port 106 and the voltage-controllable and current-bidirectional port 108, respectively. Accordingly, the controlling device 104 may provide the required power to the first external device 202 and the second external device 204 via the first voltage output port 106 and the voltage-controllable and current-bidirectional port 108, respectively.

Moreover, when the controlling device 104 outputs the first voltage level Vo1 and the second voltage level Vo2 to the first external device 202 and the second external device 204 via the voltage output port 106 and the voltage-controllable and current-bidirectional port 108 respectively, the controlling device 104 can also receive the second power supply voltage Vpp2 via the fixed voltage charging port 108 for charging the rechargeable battery 102.

Please note that the present power bank 100 is not limited to the above configuration, i.e. the circuit configuration generating the first voltage level Vo1 and the second voltage level Vo2. The power bank 100 in FIG. 1 is simply an exemplary embodiment for describing the feature of the present invention. In another embodiment of the power bank, only the circuit combination of the controlling device 104 and the voltage-controllable and current-bidirectional port 108 is used to output the second voltage level Vo2, which also belongs to the scope of the present invention. Furthermore, in another embodiment of the power bank, there may comprise a plurality of a first set of circuit combinations (i.e. the controlling device 104 and the voltage output port 106) and a plurality of a second set of circuit combinations (i.e. the controlling device 104 and the voltage-controllable and current-bidirectional port 108) for providing a plurality of fixed power supply voltages and a plurality of handshake power supply voltages to a plurality of external devices, respectively, which also belongs to the scope of the present invention.

According to the operation of the power bank 100, once the power supply voltage of an external device falls within the voltage level range Vr, and the external device has the ability of performing a handshaking operation, then the external device can perform the handshaking operation to obtain the required power supply voltage via a power line coupled to the voltage-controllable and current-bidirectional port 108 of the power bank 100. In other words, the power bank 100 is capable of adaptively providing power to the external devices having different power supply voltage requirements.

Therefore, the present power bank 100 can replace most power banks with fixed output powers. Furthermore, when an electronic device plugs into the present power bank 100, the power bank 100 does not damage the electronic device, even if the required power supply is not within the voltage level range Vr.

Figure 3:
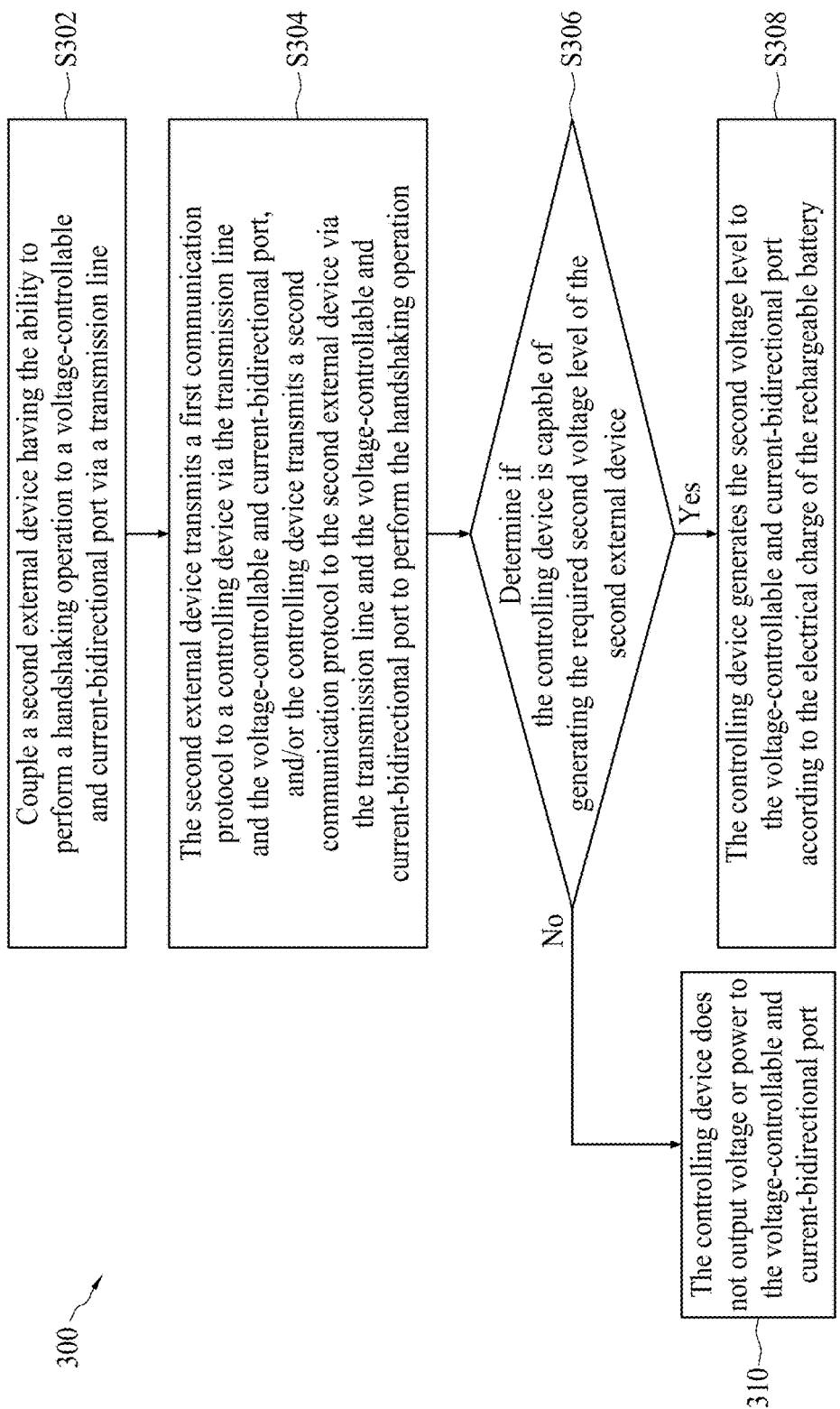
FIG. 3 is a flowchart illustrating a power bank controlling method according to an embodiment of the present invention.

Briefly, the operation of the power bank 100 can be illustrated as the power bank controlling method as shown in FIG. 3. FIG. 3 is a flowchart illustrating a power bank controlling method 300 according to an embodiment of the present invention. In step S302 of FIG. 3, the second external device 204, having the ability to perform the handshaking operation, is coupled to the voltage-controllable and current-bidirectional port 108 via the transmission line 212.

In step S304, the second external device 204 transmits the first communication protocol Shs1 to the controlling device 104 via the transmission line 212 and the voltage-controllable and current-bidirectional port 108, and/or the controlling device 104 transmits the second communication protocol Shs2 to the second external device 204 via the transmission line 212 and the voltage-controllable and current-bidirectional port 108 to perform the handshaking operation.

In step S306, it is determined if the controlling device 104 is capable of generating the required second voltage level Vo2 of the second external device 204. If the controlling device 104 is capable of generating the required second voltage level Vo2 of the second external device 204, the method goes to step S308. In step S308, the controlling device 104 generates the second voltage level Vo2 to the voltage-controllable and current-bidirectional port 108 according to the electrical charge Q of the rechargeable battery 102.

If the controlling device 104 is not able to generate the required second voltage level Vo2 of the second external device 204, the method goes to step S310. In step S310, the controlling device 104 does not output voltage or power to the voltage-controllable and current-bidirectional port 108. In short, if the second voltage level Vo2 falls within the voltage level range Vr, then the controlling device 104 generates the second voltage level Vo2 on the voltage-controllable and current-bidirectional port 108 according to the electrical charge Q of the rechargeable battery 102. If the second voltage level Vo2 is not within the voltage level range Vr, the controlling device 104 does not output the voltage or power to the voltage-controllable and current-bidirectional port 108.

Although the technical content and technical features of the present disclosure are disclosed in the above descriptions, one with ordinary skill in the art would understand substitutions and modifications may be made without departing from the spirit and scope of claims of the present disclosure. For example, many of the above disclosed processing procedures can be substituted by different implementations, other procedures or a combination of any two of the above disclosed processing procedures.

Additionally, the scope of claims of the present application is not limited to the procedures, machines, manufacture, components of matters, devices, methods or steps disclosed in the above embodiments. One with ordinary knowledge in the art of the present disclosure would understand that based on the present disclosure, the current or future developed procedures, machines, manufacture, components of matters, devices, methods or steps, which implement substantially the same functions and achieve substantially the same effects as those of the present disclosure, can be used in the present disclosure. Hence, these procedures, machines, manufacture, components of matters, devices, methods and steps fall within the scope of the following claims.

What is claimed is:

1. A power bank, comprising:
   a voltage output port, arranged to provide a first voltage level; and
   a voltage-controllable and current-bidirectional port, arranged to selectively transit a first communication protocol;
   a rechargeable battery, coupled to the voltage-controllable and current-bidirectional port, and having an electrical charge; and
   a controlling device, coupled to the voltage-controllable and current-bidirectional port and the rechargeable battery;
   wherein when the voltage-controllable and current-bidirectional port is arranged to transit the first communication protocol, the voltage-controllable and current-bidirectional port is arranged to output a second voltage level according to the first communication protocol; and
   wherein when the voltage-controllable and current-bidirectional port is arranged to transit the first communication protocol, the controlling device generates the second voltage level on the voltage-controllable and current-bidirectional port according to the first communication protocol and the electrical charge.

2. The power bank of claim 1, wherein the first voltage level is a predetermined voltage level, and the second voltage level is an arbitrary voltage within a voltage level range.

3. The power bank of claim 1, wherein the voltage output port and the voltage-controllable and current-bidirectional port provide the first voltage level and the second voltage level, respectively, at the same time.

4. The power bank of claim 1, wherein the voltage-controllable and current-bidirectional port is coupled to an external device for transiting the first communication protocol.

5. The power bank of claim 4, wherein the controlling device is arranged to receive the first communication protocol via the voltage-controllable and current-bidirectional port, and perform a handshaking operation with the external device to determine the second voltage level via the voltage-controllable and current-bidirectional port.

6. The power bank of claim 5, wherein the controlling device further outputs a second communication protocol to the external device via the voltage-controllable and current-bidirectional port in order to perform the handshaking operation for determining the second voltage level.

7. The power bank of claim 1, wherein when the voltage-controllable and current-bidirectional port is arranged to receive a first power supply voltage, the controlling device charges the rechargeable battery by using the first power supply voltage.

8. The power bank of claim 7, further comprising:
   a fixed voltage charging port, arranged to receive a second power supply voltage;
   wherein the controlling device further couples to the fixed voltage charging port, and when the voltage-controllable and current-bidirectional port is arranged to receive the first power supply voltage and the fixed voltage charging port is arranged to receive the second power supply voltage, the controlling device charges the rechargeable battery by using the first power supply voltage and the second power supply voltage at the same time, or charges the rechargeable battery by using the first power supply voltage but not the second power supply voltage, or charges the rechargeable battery by using the second power supply voltage but not the first power supply voltage.

9. A power bank system, comprising:
   an external device; and
   a power bank, comprising:
      a voltage output port, arranged to provide a first voltage level; and
      a voltage-controllable and current-bidirectional port, arranged to selectively couple to the external device;
      a rechargeable battery, coupled to the voltage-controllable and current-bidirectional port, and having an electrical charge; and
      a controlling device, coupled to the voltage-controllable and current-bidirectional port and the rechargeable battery;
      wherein when the voltage-controllable and current-bidirectional port is coupled to the external device, the voltage-controllable and current-bidirectional port is arranged to transit a first communication protocol and output a second voltage level to the external device according to the first communication protocol; and
      wherein when the voltage-controllable and current-bidirectional port is arranged to couple to the external device for transiting the first communication protocol, the controlling device generates the second voltage level on the voltage-controllable and current-bidirectional port according to the first communication protocol and the electrical charge.

10. The power bank system of claim 9, wherein the first voltage level is a predetermined voltage level, and the second voltage level is any voltages within a voltage level range.

11. The power bank system of claim 9, wherein the voltage output port and the voltage-controllable and current-bidirectional port provide the first voltage level and the second voltage level respectively at the same time.

12. The power bank system of claim 9, wherein the controlling device is arranged to receive the first communication protocol via the voltage-controllable and current-bidirectional port, and perform a handshaking operation with the external device to determine the second voltage level via the voltage-controllable and current-bidirectional port.

13. The power bank system of claim 12, wherein the controlling device further outputs a second communication protocol to the external device via the voltage-controllable and current-bidirectional port in order to perform the handshaking operation for determining the second voltage level.

14. The power bank system of claim 9, wherein when the voltage-controllable and current-bidirectional port is arranged to receive a first power supply voltage, the controlling device charges the rechargeable battery by using the first power supply voltage.

15. The power bank system of claim 14, further comprising:
a fixed voltage charging port, arranged to receive a second power supply voltage;
wherein the controlling device further couples to the fixed voltage charging port, and when the voltage-controllable and current-bidirectional port is arranged to receive the first power supply voltage and the fixed voltage charging port is arranged to receive the second power supply voltage, the controlling device charges the rechargeable battery by using the first power supply voltage and the second power supply voltage at the same time, or charges the rechargeable battery by using the first power supply voltage but not the second power supply voltage, or charges the rechargeable battery by using the second power supply voltage but not the first power supply voltage.

16. A power bank controlling method, comprising:
(a) providing a first voltage level on a voltage output port;
(b) selectively using a voltage-controllable and current-bidirectional port to transit a first communication protocol;
(c) when the voltage-controllable and current-bidirectional port is arranged to transit the first communication protocol, outputting a second voltage level on the voltage-controllable and current-bidirectional port according to the first communication protocol; and
(d) when the voltage-controllable and current-bidirectional port is arranged to transit the first communication protocol, outputting the second voltage level on the voltage-controllable and current-bidirectional port according to the first communication protocol and an electrical charge of a rechargeable battery.

17. The power bank controlling method of claim 16, wherein the first voltage level is a predetermined voltage level, and the second voltage level is any voltages within a voltage level range.

18. The power bank controlling method of claim 16, wherein step (b) comprises:
transiting the first communication protocol by the voltage-controllable and current-bidirectional port that is coupled to an external device.

19. The power bank controlling method of claim 18, wherein step (c) comprises:
performing a handshaking operation with the external device via the voltage-controllable and current-bidirectional port to determine the second voltage level according to the first communication protocol.

20. The power bank controlling method of claim 16, further comprising:
when the voltage-controllable and current-bidirectional port is arranged to receive a first power supply voltage, charging the rechargeable battery by using the first power supply voltage.

21. The power bank controlling method of claim 20, further comprising:
using a fixed voltage charging port to receive a second power supply voltage; and
when the voltage-controllable and current-bidirectional port is arranged to receive the first power supply voltage and the fixed voltage charging port is arranged to receive the second power supply voltage, charging the rechargeable battery by using the first power supply voltage and the second power supply voltage at the same time, or charging the rechargeable battery by using the first power supply voltage and not using the second power supply voltage, or charging the rechargeable battery by using the second power supply voltage and not using the first power supply voltage.

* * * * *